United States Patent Office 3,342,778
Patented Sept. 19, 1967

3,342,778
PERFLUOROALKYL PERFLUOROVINYL KETONES AND THEIR POLYMERS
Burton C. Anderson, Wilmington, Del., assignor to E. I. du Pont de Nemours and Company, Wilmington, Del., a corporation of Delaware
No Drawing. Filed June 22, 1964, Ser. No. 377,095
19 Claims. (Cl. 260—63)

This invention relates to new unsaturated perfluoroketones and their polymers, and to a process of preparing these compounds.

The new products of this invention are the monomeric perfluoroalkyl perfluorovinyl ketones of the general formula $CF_2=CF-CO-R$, where R is a perfluoroalkyl radical, and the polymers of these monomers.

These ketones, which can also be called perfluoro-1-alkene-3-ones, are prepared by the following sequence of steps. In each of the equations below, the symbol R stands for a perfluoroalkyl group.

(A) A 3-perfluoroalkyl-1,1,2-trifluoro-1-propene-3-ol (more simply called a 3H-perfluoro-1-alkene-3-ol) is brominated in accordance with the equation (1)
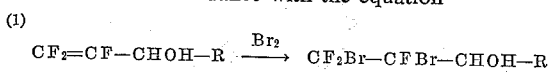

(B) The resulting 3-perfluoroalkyl-1,2-dibromo-1,1,2-trifluoropropane-3-ol (more simply called 3H-1,2-dibromoperfluoroalkane-3-ol) is oxidized in accordance with the equation (2)
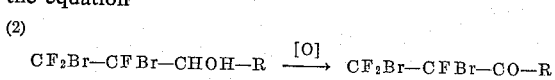

(C) The resulting perfluoroalkyl (1,2-dibromo-1,1,2-trifluoro)ethyl ketone (more simply called 1,2-dibromoperfluoroalkane-3-one) is debrominated by treatment with zinc to give the corresponding perfluoroalkyl perfluorovinyl ketone, or perfluoro-1-alkene-3-one, in accordance with the equation (3)
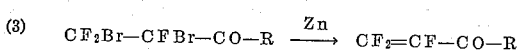

Upon exposure to a free radical-generating source, the perfluoro-1-alkene-3-ones, either by themselves or in admixture with polymerizable ethylenic monomers having terminal carbon-to-carbon unsaturation, polymerized to give homopolymers and copolymers, ranging in physical aspect from viscous liquids to solids.

The starting materials in the above-described process, i.e., the 3H-perfluoro-1-alkene-3-ols, can be prepared by reacting a perfluoroaldehyde R—CHO (R=perfluoroalkyl) with trifluorovinyl magnesium bromide, followed by hydrolysis of the reaction product, as shown in the following equation:

(4)
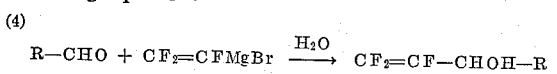

Instead of a trifluorovinyl magnesium halide, trifluorovinyllithium may be used. This method has been applied [see Tarrant, Johncock & Savory, J. Org. Chem. 28 (1963)] to the preparation of the alcohol

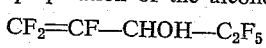

from pentafluoropropionaldehyde.

Any 3H-perfluoro-1-alkene-3-ol can be used as the starting material. Solely because of the relative accessibility of the perfluoro aldehydes (themselves derived from the corresponding perfluorocarboxylic acids), the preferred starting materials are the 3H-perfluoro-1-alkene-3-ols having from 4 to 16 carbon atoms, i.e., the alcohols $CF_2=CF-CHOH-R$, where R is a perfluoroalkyl radical having from 1 to 13 carbon atoms.

In the first step of the process, the 3H-perfluoro-1-alkene-3-ol is brought into intimate contact with bromine. The relative proportions of the two reactants are immaterial but, for better utilization of the organic reactant, it is preferred to use a molar equivalent of bromine or a slight excess thereover. In general, no solvent is necessary but, if desired, an inert organic solvent can be used, such as carbon tetrachloride, perfluoromethylcyclohexane, carbon disulfide, chloroform, and the like. The bromination takes place even at low temperatures, such as −20° C., and it is in general unnecessary and undesirable to operate above about 75° C., the preferred temperature range being 15–50° C. The bromination can be carried out in ordinary natural or artificial light, but it is accelerated by actinic radiation such as ultraviolet light. The resulting 3H-1,2-dibromoperfluoroalkane-3-ol can be isolated by distillation at atmospheric or reduced pressure. These compounds have two asymmetric carbon atoms and are therefore obtained as mixtures of two diastereoisomeric forms.

In the second step, the 3H-1,2-dibromoperfluoroalkane-3-ol is oxidized to the corresponding ketone. Any of the usual oxidizing agents known to convert a secondary alcohol group to a keto group can be used for this purpose, such as chromium trioxide in an acidic medium (e.g., glacial acetic acid or aqueous sulfuric acid), potassium permanganate in neutral or acidic medium, or an alkali metal (potassium or sodium) dichromate in acidic medium. The last named oxidizing agent is the preferred one from the standpoint of obtaining high yields. The oxidation temperature is not critical but the reaction is normally conducted at a temperature in the range of 20–100° C. The reaction product may be isolated from the mixture by simple distillation or steam distillation, or it may be first extracted with a suitable organic solvent.

In the third and last step of the process, the debromination of the 1,2-dibromoperfluoroalkane-3-one resulting from the second step is accomplished by bringing it in contact with at least the stoichiometric amount of zinc, and preferably an excess thereover, which may be quite substantial. The reaction medium is one of the oxygen-containing organic liquids commonly used in dehalogenation reactions. The preferred reaction media are the acyclic or cyclic ethers such as diethyl ether, di-n-butyl ether, 1,2-dimethoxyethane, β,β′-dimethoxydiethyl ether, tetrahydrofuran or dioxane, and of these, the last named is the preferred one. The debromination reaction is slow at ordinary temperatures, and it is best carried out at temperatures between about 50° C. and 125° C., at either atmospheric or superatmospheric pressures. The resulting perfluoro-1-alkane-3-one is separated from the reaction medium by fractional distillation and/or chromatographic methods. These products can be distilled without decomposition, and they exhibit the low boiling points characteristic of perfluorinated compounds.

While the monomeric perfluoroalkyl perfluorovinyl ketones, i.e., the perfluoro-1-alkene-3-ones, show little or no tendency to spontaneous polymerization, even in the absence of inhibitors, they can be polymerized or copolymerized upon exposure to a free radical-generating source. Under such conditions, polymerization takes place even at subnormal temperatures, e.g., 0° C., although temperatures in the range of 10–75° C. are preferred. One method of generating free radicals consists in exposing the unsaturated ketone to ultraviolet light, i.e., light of wavelength in the range of about 1800 to 3800 A. units. If desired, this may be done in the presence of one of the known photopolymerization initiators such as biacetyl, benzoin, benzoin alkyl ethers, and the like. Another source of free radicals is found in the well known free radical-producing polymerization initiators, including, for example, the diacyl peroxides such as diacetyl peroxide or dibenzoyl peroxide; the dialkyl peroxides such as di-tert.-butyl peroxide; the persalts such as the ammonium and alkali metal persulfates, perborates or percarbonates; the azonitriles, particularly those described in U.S. Patent 2,471,959; dinitrogen difluoride; and the like. Such agents need only be used in catalytic amounts, e.g., between 0.001 and 0.05 mole per mole of total polymerizable material. Yet another free radical-generating source employs the various forms of ionizing radiation, which is radiation having sufficient energy to remove an electron from a gas atom, forming an ion pair, the required energy being of the order of at least 50 electron volts.

The perfluoro-1-alkene-3-ones copolymerize with one or more other polymerizable ethylenic monomers having terminal carbon-to-carbon unsaturation. The preferred comonomers, chiefly for reasons of accessibility, are those containing from 2 to 8 carbon atoms. Examples of suitable comonomers are the fluoroethylenes of the formula $CFX=CYZ$, where X, Y and Z are hydrogen or halogen of atomic number 9 to 35, inclusive, such as vinyl fluoride, vinylidene fluoride, bromotrifluoroethylene, chlorotrifluoroethylene, 1,2-dichloro-1,2-difluoroethylene, 1-bromo - 1,2 - difluoroethylene, tetrafluoroethylene, 1 - chloro-2,2-difluoroethylene, 1,1-dichloro-2-fluoroethylene, 1-chloro-1-fluoroethylene, etc.; the terminally unsaturated hydrocarbons and halohydrocarbons such as ethylene, propylene, isobutylene, 1,3-butadiene, styrene, p-chlorostyrene, 2-chloro-1,3-butadiene, hexafluoropropylene, perfluoro-1-octene, etc.; the vinyl carboxylates such as vinyl acetate, vinyl propionate, vinyl butyrate, vinyl caproate; and the acrylic and methacrylic esters and nitriles, such as ethyl acrylate, methyl methacrylate, n-butyl methacrylate, acrylonitrile, methacrylonitrile, etc. Depending on the relative proportions and aptitudes of the comonomers to polymerize, copolymers containing variable amounts of the ketone component can be obtained. In general, the copolymers contain between 5 and 75% by weight, and usually between 10 and 75%, of polymerized perfluoro-1-alkene-3-one.

The following examples describe various embodiments of the invention in greater detail. It is to be understood that these embodiments do not comprise the entire invention, but are intended rather to be illustrative of a broader inventive concept for which protection by the patent laws is being sought. The invention in its broader context finds supporting disclosure throughout the entire specification, not in the examples alone.

EXAMPLE I

The starting material in this example, 3H-per-fluoro-1-butene-3-ol, $CF_2=CF-CHOH-CF_3$, was prepared as follows: A 4-necked flask fitted with a Dry Ice reflux condenser protected by a drying tube, a thermometer, a dropping funnel and a stirrer was charged with 100 ml. of dry tetrahydrofuran and 13.6 g. of magnesium. The stirred mixture was cooled to $-30°$ C. and a solution of 90 g. of trifluorovinyl bromide was added during one hour. A vigorous, exothermic reaction occurred, and the temperature reached $-20°$ C. on several occasions. After completion of the addition, the mixture was stirred one hour, after which trifluoroacetaldehyde (25 ml. of liquid at $-80°$ C.) was distilled into the solution slowly. Reaction occurred, during which the maximum temperature of the reaction mixture was $-5°$ C. After one additional hour of stirring, the mixture was allowed to warm to room temperature temporarily, then stored at about 5° C. for 64 hours. The solvents were then removed under reduced pressure and the dark, viscous residue was treated with 250 ml. of concentrated, cold sulfuric acid. Hydrolysis took place on heating to 100° C., at which temperature volatile products distilled under reduced pressure and were collected in a cold trap. Fractionation of this distillate gave 27.8 g. of 3H-perfluoro-1-butene-3-ol, B.P., 79–85° C., $n_D^{25}$ 1.3164. A sample was purified for analysis by gas chromatography on a silicone oil column at about 50° C.

*Analysis.*—Calc'd for $C_4H_2F_6O$: C, 26.68; H, 1.12; F, 63.31. Found: C, 26.66; H, 1.54; F, 61.54.

The infrared and nuclear magnetic resonance spectra agreed with the structure.

From this product, perfluoro-1-butene-3-one was prepared by the following sequence of steps.

A. 3H-1,2-dibromoperfluorobutane-3-ol

In a flask fitted with a stirrer and a reflux condenser protected by a drying tube were placed 79.8 g. of 3H-perfluoro-1-butene-3-ol and 71 g. of bromine. The mixture was stirred and irradiated with a sunlamp for 50 hours, the internal temperature being about 25–40° C. The unreacted bromine was removed with a stream of nitrogen and the reaction product was distilled. Redistillation of the fraction boiling at 145–162° C. gave 120.9 g. of 3H - 1,2 - dibromoperfluorobutane-3-ol, B.P., 145–152° C. An analytical sample boiled at 150° C.

*Analysis.*—Calc'd for $C_4H_2Br_2F_6O$: C, 14.13; H, 0.59; Br, 47.02; F. 33.54. Found: C, 14.33; H, 0.55; Br, 46.60; F, 33.37.

The infrared spectrum was consistent with the structure and the nuclear magnetic resonance and gas chromatographic analysis of constant boiling fractions were consistent with the presence of two diastereoisomeric forms of the compound.

B. 1,2-dibromoperfluorobutane-3-one

A mixture of 124 g. of 3H-1,2-dibromoperfluorobutane-3-ol and 39 ml. of concentrated sulfuric acid was heated to 65° C. To the stirred mixture was added dropwise a solution of 111 g. of sodium dichromate dihydrate in 155 ml. of water and 64.5 ml. of concentrated sulfuric acid. The temperature of the reaction mixture rose to 95° C., then dropped. When it dropped to 80° C., the mixture was heated on a steam bath and the speed of addition was increased to keep the temperature between 80 and 90° C. The addition of the dichromate solution required 45 minutes. The mixture was then heated under reflux (pot temperature 92° C.) for two days, after which 150 ml. of concentrated sulfuric acid was added and the reaction product was distilled under reduced pressure into a Dry Ice-cooled receiver. The distillate (125 g.) was added to 50 g. of phosphorus pentoxide to remove the remaining water and the mixture was distilled, giving 114 g. of product boiling at 95–100° C. Final redistillation in a spinning band still gave 93.2 g. of 1,2-dibromoperfluorobutane-3-one, B.P., 98.5–99.5° C., $n_D^{25}$ 1.3717.

*Analysis.*—Calc'd for $C_4Br_2F_6O$: C, 14.22; F, 33.74. Found: C, 14.56; F, 33.54.

C. Perfluoro-1-butene-3-one

A still, fitted with a spinning band fractionating column (such as is described in U.S. Patent 2,712,520), was charged with 20 g. of zinc dust and 50 ml. of dry dioxane. The mixture was heated to the refluxing point of the solvent (about 100° C.) and stirred, and about 10 g. of 1,2-dibromoperfluorobutane-3-one was added dropwise. As the addition was begun, a low boiling distillate was removed at the head of the column. This consisted of perfluoro-1-butene-3-one codistilling with dioxane. Gas chromatography of this product separated a fraction identified as perfluoro-1-butene-3-one, B.P., about 34° C.

*Analysis.*—Calc'd for $C_4F_6O$: C, 26.98; F, 64.03. Found: C, 27.24; F, 63.28.

The ultraviolet and nuclear magnetic resonance spectra supported the structure.

EXAMPLE II

A sample of perfluoro-1-butene-3-one was sealed in a quartz ampoule and irradiated for 5 days at room temperature by a low pressure mercury resonance arc, after which any volatile material was removed by warming at 30° C. under 0.2 mm. pressure. There remained a viscous residue which was shown by elemental analysis and infrared and nuclear magnetic resonance spectra to be polymerized perfluoro-1-butene-3-one.

*Analysis.*—Calc'd for $C_4F_6O$: C, 26.98; F, 64.03. Found: C, 27.19; F, 64.91.

EXAMPLE III

The starting material in this example, 3H-perfluoro-1-pentene-3-ol, was prepared by the procedure used for the starting material in Example I from 360 g. of trifluorovinyl bromide, 49 g. of magnesium turnings and 80 ml. (measured at −80° C.) of pentafluoropropionaldehyde. Following hydrolysis with sulfuric acid at about 120° C. (this is a vigorous exothermic reaction), there was obtained 66.4 g. of 3H-perfluoro-1-pentene-3-ol, B.P., 83–91° C., identified by infrared and nuclear magnetic resonance spectral analyses.

A. *3H-1,2-dibromoperfluoropentane-3-ol*

A mixture of 64 g. of 3H-perfluoro-1-pentene-3-ol and 48 g. of bromine was stirred for one hour to allow a slight exothermic reaction to subside, and then it was irradiated with ultraviolet light for 18 hours. Distillation of the reaction product gave 86.9 g. of 3H-1,2-dibromoperfluoropentane-3-ol. An analytical sample boiled at 90–91° C. at 97 mm. pressure, $n_D^{25}$ 1.3861.

*Analysis.*—Calc'd for $C_5H_2Br_2F_8O$: F, 38.98; Br, 40.00. Found: F, 38.24; Br, 40.46.

B. *1,2-dibromoperfluoropentane-3-one*

To a stirred mixture of 83.7 g. of 3H-1,2-dibromoperfluoropentane-3-ol and 23 ml. of concentrated sulfuric acid was added during 15 minutes a solution prepared from 65.5 g. of sodium dichromate dihydrate, 92 ml. of water and 38 ml. of concentrated sulfuric acid. The mixture was stirred and heated at 95–100° C. for 24 hours. After addition of 90 ml. of concentrated sulfuric acid, the liquid products were distilled under reduced pressure into a Dry Ice-cooled receiver. The distillate was treated with phosphorus pentoxide and again vacuum-distilled. Final distillation over 15 g. of phosphorus pentoxide gave 66.3 g. of 1,2-dibromoperfluoropentane-3-one, B.P., 112–116.5° C. An analytical sample boiled at 116.5° C., $n_D^{25}$ 1.3587.

*Analysis.*—Calc'd for $C_5Br_2F_8O$: F, 39.17; Br, 41.20. Found: F, 38.08, Br, 40.33.

C. *Perfluoro-1-pentene-3-one*

A spinning band still was charged with 30 ml. of dry dioxane and 20 g. of zinc dust. The mixture was heated with stirring and 5 ml. of dioxane was distilled. The column was then set to a slow take-off and 4.8 g. of 1,2-dibromoperfluorobutane-3-one was added in small portions to the mixture in the still pot. A vigorous reaction occurred and distillate boiling at 85–100° C. (about 20 ml.) was collected. The perfluoro-1-pentene-3-one present in this material was separated by gas chromatography on 48–65 mesh firebrick with a silicone oil as the stationary liquid. On distillation, the ketone boiled at 62° C.

*Analysis.*—Calc'd for $C_5F_8O$: C, 26.33; F, 66.66. Found: C, 25.85; F, 66.62.

The infrared spectrum showed absorption bands at 5.6 and 5.9$\mu$. The ultraviolet spectrum showed $\lambda_{max}$. at 242 m$\mu$ ($\epsilon$=5500) and 318 m$\mu$ ($\epsilon$=27). The nuclear magnetic resonance spectrum also supported the assigned structure.

EXAMPLE IV

A sample of perfluoro-1-pentene-3-one in a sealed quartz tube was irradiated for 10 days by a low pressure mercury resonance arc. The unreacted monomer was removed by warming under reduced pressure, leaving a viscous oil which was shown by infrared spectral analysis to be polymerized perfluoro-1-pentene-3-one.

EXAMPLE V

A small collapsible platinum tube was charged at low temperature with 1 ml. of perfluoro-1-pentene-3-one and 1 ml. of tetrafluoroethylene (measured as the liquid). To this was added 4 mg. of dinitrogen difluoride, after which the tube was sealed and heated 6 hours with agitation at 70° C. under a hydraulic pressure of 3,000 atmospheres. There was obtained 1.85 g. of a solid material which was shown by infrared examination (band at 5.6$\mu$ characteristic of fluorocarbonyl compounds) to be a copolymer of perfluoro-1-pentene-3-one and tetrafluoroethylene. Differential thermal analysis showed a softening point of 240° C. for this copolymer as compared to 310° C. for polytetrafluoroethylene. The copolymer could be pressed at 250° C. on aluminum foil backing to give a smooth film.

EXAMPLE VI

A small collapsible platinum tube was charged with 0.9 ml. of perfluoro-1-pentene-3-one, 2.64 g. of ethylene and 6 mg. of dinitrogen difluoride. The tube was exhausted at 0.1 mm. pressure at −196° C. and sealed by welding. It was then heated for 6 hours at 70° C. in a bomb under an external hydraulic pressure of 3,000 atmospheres. After cooling, the tube was opened and the unreacted ethylene was allowed to escape. There was obtained 1.5 g. of an elastomeric, tacky copolymer of perfluoro-1-pentene-3-one and ethylene. This copolymer contained 49.83% of fluorine, corresponding to an about 3:1 molar ratio of polymerized ethylene to polymerized fluoroketone.

EXAMPLE VII

A sealed glass ampoule containing 4 ml. of methyl methacrylate and 0.7 ml. of perfluoro-1-pentene-3-one was irradiated with a low pressure mercury resonance arc for 26 hours. The resulting copolymer of perfluoro-1-pentene-3-one and methyl methacrylate was pressed at 180° C. and 5000 lb./sq. in. to a translucent film. This copolymer contained 10.85% of fluorine, corresponding to a methyl methacrylate/fluoroketone molar ratio of about 12:1.

EXAMPLPE VIII

A platinum tube was charged with 0.7 ml. of perfluoro-1-pentene-3-one, 3 ml. of acrylonitrile and 6 mg. of dinitrogen difluoride as in Example VI and subjected to the same treatment. There was obtained 2.57 g. of a copolymer of perfluoro-1-pentene-3-one and acrylonitrile. Its fluorine content, 18.32%, indicated a molar ratio of acrylonitrile to fluoroketone of about 11:1.

EXAMPLE IX

A sealed quartz ampoule containing 0.7 ml. of perfluoro-1-pentene-3-one, 4.0 ml. of vinyl acetate and 0.05 g. of $\alpha,\alpha'$-azobisisobutyronitrile was irradiated with a low pressure mercury resonance arc for 5 days. The resulting copolymer of perfluoro-1-pentene-3-one and vinyl acetate was dissolved in 200 ml. of benzene and reprecipitated by addition of hexane as a rather soft resin which was freed from solvent by drying under reduced pressure. The copolymer contained 12.24% of fluorine, corresponding to a vinyl acetate/fluoroketone molar ratio of about 12:1.

The described process is applicable to the preparation of any perfluoro-1-alkene-3-one, or perfluoroalkyl perfluoromethyl ketone, and their polymers and copolymers. In view of the easier accessibility of the starting materials (the 3H-perfluoro-1-alkene-3-ols) which have from 4 to 16 carbon atoms, the preferred monomers of this invention are the perfluoro-1-alkene-3-ones of 4 to 16 carbon atoms, i.e., the ketones of the formula

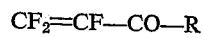

where R is a perfluoroalkyl radical (which may be straight chain or branched chain) of 1 to 13 carbon atoms. Additional specific examples of ketones of this type include the following: perfluoro-1-pentene-4-methyl-3-one

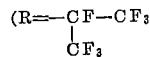

from 3H-perfluoro-4-methyl-1-pentene-3-ol); perfluoro-1-hexene-3-one [R=—(CF$_2$)$_2$—CF$_3$, from 3H-perfluoro-1-hexene-3-ol]; perfluoro-1-heptene-3-one

from 3H-perfluoro-1-heptene-3-ol]; perfluoro-1-nonene-5-methyl-3-one

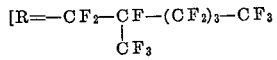

from 3H-perfluoro-1-nonene-5-methyl-3-ol]; perfluoro-1-decene-3-one [R=—(CF$_2$)$_6$—CF$_3$, from 3H-perfluoro-1-decene-3-ol]; perfluoro-1-dodecene-3-one

from 3H-perfluoro-1-dodecene-3-ol]; and perfluoro-1-hexadecene-3-one [R=—(CF$_2$)$_{12}$—CF$_3$, from 3H-perfluoro-1-hexadecene-3-ol]. On exposure to free radical-producing conditions, alone or with other polymerizable terminally unsaturated ethylenic monomers, these monomeric ketones are converted to the corresponding polymers.

These polymers are compatible with many other polymers, particularly with fluorinated polymers, for which they are useful as plasticizers. They are also useful in the formation of shaped articles such as films or molded objects. The lower molecular weight polymers are useful further as adhesives and for the coating, binding and impregnation of fibrous materials such as paper, wood, and textiles. They are also useful as stable fluids and greases for lubricating purposes.

Besides their utility as sources of valuable polymers, the monomeric perfluoro-1-alkene-3-ones of this invention are useful in themselves by virtue of their swelling and solvent action on addition polymers of the ester type, such as polyvinyl acetate. Thus, they are useful as plasticizers and solvents for such polymers, e.g., in the preparation of shaped objects therefrom, e.g., in the casting of films.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

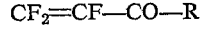

wherein R is a perfluoroalkyl group of up to and including 13 carbon atoms.

2. Polymers selected from the class consisting of homopolymers of the compounds of claim 1 and copolymers of the compounds of claim 1 with at least one polymerizable ethylenic monomer having terminal carbon-to-carbon unsaturation.

3. A homopolymer of a compound as defined in claim 1.

4. A copolymer of a compound as defined in claim 1 and a fluoroethylene of the formula

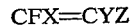

wherein X, Y and Z are selected from the group consisting of hydrogen and halogen of atomic number 9 to 35 inclusive.

5. Perfluoro-1-butene-3-one.
6. A polymer of perfluoro-1-butene-3-one.
7. Perfluoro-1-pentene-3-one.
8. A polymer of perfluoro-1-pentene-3-one.
9. A copolymer of perfluoro-1-pentene-3-one and ethylene.
10. A copolymer of perfluoro-1-pentene-4-one and tetrafluoroethylene.
11. A copolymer of perfluoro-1-pentene-3-one and methyl methacrylate.
12. A copolymer of perfluoro-1-pentene-3-one and acrylonitrile.
13. A copolymer of perfluoro-1-pentene-3-one and vinyl acetate.
14. A shaped article formed from a polymer of a compound as defined in claim 1.
15. A film formed from a polymer of a compound as defined in claim 1.
16. Process which comprises brominating a 3-perfluoroalkyl-1,1,2-trifluoro-1-propene-3-ol, oxidizing the resultant 3 - perfluoroalkyl-1,2-dibromo-1,1,2-trifluoropropane-3-ol, and debrominating the resultant 1,2-dibromoperfluoroalkane-3-one by treatment with at least a stoichiometric amount of zinc to obtain the corresponding perfluoroalkyl perfluorovinyl ketone.
17. The process as defined by claim 16 wherein said brominating step is carried out at a temperature in the range 15° C. to 50° C. and in the presence of actinic radiation, wherein said oxidizing step is carried out at a temperature in the range 20° C. to 100° C., and wherein said debrominating step is carried out at a temperature in the range 50° C. to 125° C.
18. Process which comprises exposing a compound of formula

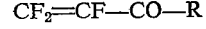

wherein R is a perfluoroalkyl group, to a free radical-generating source and recovering the resultant polymer.
19. The process as defined in claim 18 wherein said compound is admixed wtih at least one polymerizable ethylenic monomer having terminal carbon-to-carbon unsaturation.

No references cited.

WILLIAM H. SHORT, *Primary Examiner.*

L. LEE, *Assistant Examiner.*

UNITED STATES PATENT OFFICE
CERTIFICATE OF CORRECTION

Patent No. 3,342,778                        September 19, 1967

Burton C. Anderson

It is hereby certified that error appears in the above numbered patent requiring correction and that the said Letters Patent should read as corrected below.

Column 1, line 45, for "polymerized" read -- polymerize --; column 3, line 49, for "-per-fluoro-1-" read -- -perfluoro-1- --; column 8, line 19, for "-pentene-4-one" read -- -pentene-3-one --; line 51, for "wtih" read -- with --.

Signed and sealed this 21st day of January 1969.

(SEAL)
Attest:

Edward M. Fletcher, Jr.                                    EDWARD J. BRENNER

Attesting Officer                                               Commissioner of Patents